Jan. 18, 1966 R. C. SUTTER 3,229,708
LUBRICATED VALVE MECHANISM
Filed Feb. 15, 1962 2 Sheets-Sheet 2

INVENTOR.
RAYMOND C. SUTTER
BY
ATTORNEYS

United States Patent Office 3,229,708
Patented Jan. 18, 1966

3,229,708
LUBRICATED VALVE MECHANISM
Raymond C. Sutter, 808 Piermont St., Philadelphia, Pa.
Filed Feb. 15, 1962, Ser. No. 173,594
4 Claims. (Cl. 137—246.12)
(Granted under Title 35, U.S. Code (1952), sec. 266)

The invention described herein may be manufactured and used by or for the Government for governmental purposes without the payment to me of any royalty thereon.

This invention relates to a valve mechanism by means of which high temperature and high pressure gas is supplied to a double acting pump from a gas generator. An object is to provide a mechanism of this sort which will be quick in action and which will not find or stick when confronted with the temperature differences to which the various valves may be subjected. The pump supplies liquid under still higher pressure than the valve mechanism for operation of a desired hydraulic device.

Poppet valves were tried but found possessed of a tendency to bind at high temperatures. A spring toggle mechanism was tried out and found to possess the same objection of sticking due to the use of gas pressures as high as 1500 pounds per square inch at a temperature of 600° F. After a number of unsatisfactory trials the hereinafter disclosed valve mechanism was the only one capable of providing quickness in opening with less trouble from binding or sticking.

Specifically the factors contributing to the success of this invention include the use of gas from the generator at 1500 pounds per square inch and at the temperature of 600° F. to actuate a piston rapidly. There is a lost motion connection between this piston and a valve mechanism controlling said pump so that a tendency for said valve mechanism to stick may be overcome not only by the high pressure gas on said piston but also by the kinetic energy of impact due to such lost motion connection. Another feature contributing to the success of this invention has been the provision of a pump for placing high temperature lubricating grease under substantially the same high pressure as the hot gas controlled by the valve mechanism.

Referring to the drawing:

FIG. 1 is a longitudinal section through a prefered embodiment of this invention;

FIG. 2 exemplifies the environment in which the valve mechanism of FIG. 1 is used;

Figure 1:
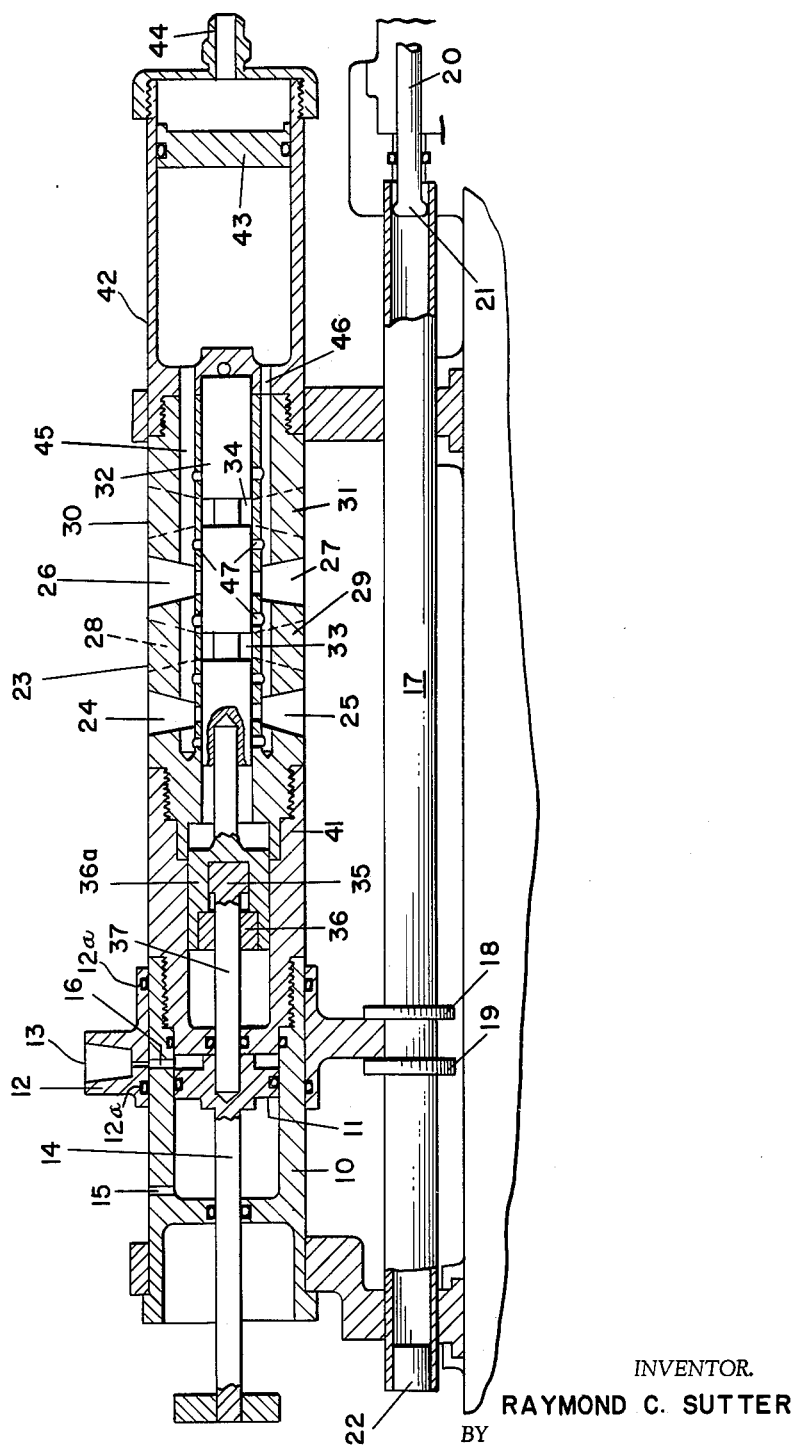

A high pressure cylinder 10 at the left side of FIG. 1 contains a piston 11 slidable therein under pressure transmitted through a sleeve 12 slidable on the outside of said cylinder, a flexible hose connection from a gas generator being attached for supplying gas under pressure to a port 13. A piston rod 14 extends out the left end of cylinder 10 for hand movement of rod 14 and its attachments to be described later. An end of cylinder 10 is provided with a port 15 and the opposite end of the cylinder is provided with port 16. At one side of the cylinder 10 is a tube 17 slidably mounted in the supports illustrated for the cylinder 10. Spaced flanges 18 and 19 on this tube 17 are on each side of an extension of said sleeve 12 whereby movement of tube 17 is transmittted to the sleeve 12. A rod 20 provided with an enlarged end 21 is connected to the piston of a double acting pump shown in FIG. 2 for pulling the tube 17 to the right. A plug 22 is secured in the tube 17 where desired for moving the tube to the left when the end 21 of rod impinges upon this plug.

An extension 23 secured to cylinder 10 is provided with ports 24, 25, 26 and 27 shown in full lines and with the additional ports 28, 29, 30 and 31 shown in dotted lines. The pipes connected to these ports lead to the pump and gas generator shown in FIG. 2. Within cylindrical extension 23 is spool 32 having two portions 33 and 34 of reduced diameter to enable gas from opposite ports to move around these portions 33 and 34. An enlarged end 35 of rod 37 secured to piston 11 is slidable through a bushing 36. On movement of piston 11 rapidly to the left from the position illustrated the piston has gained momentum before the enlarged end 35 engages bushing 36. This is to enable the impact blow of rod 37 upon spool 32 and its illustrated connection to be sharp enough to overcome a tendency for the balanced spool valve to stick from expansion caused by the hot gas passing around the reduced portions 33 and 34 or from carbonaceous and other materials carried in the gas from the connected generator. When piston 11 moves in the opposite direction or toward the right, it is the right end of enlarged end 35 which moves first and has substantial momentum before wall of the guide element 36a is engaged sharply to release a tendency in the spool valve to stick.

Figure 2:
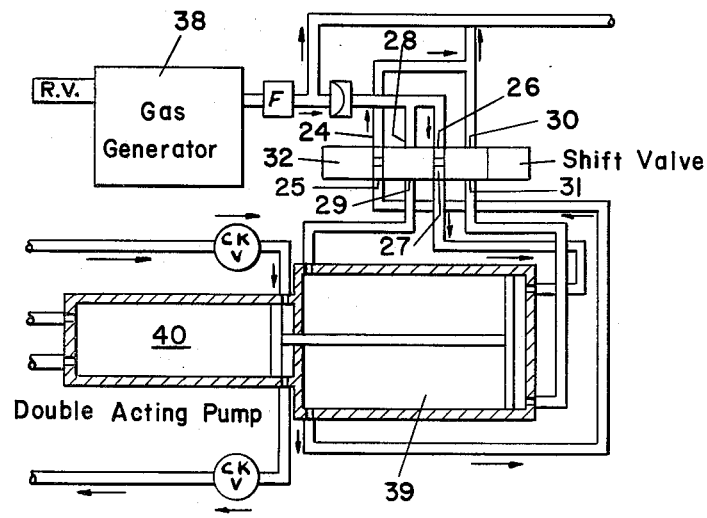

Referring to FIG. 2 a gas generator 38 is of the type supplying gas under the aforementioned pressure and a temperature of about 900° F. for the required time of 8 minutes using a known type solid fuel. The two way pump 39 utilizes gas from generator 38 through pipe connections illustrated. Directly connnected to pump 39 is a hydraulic pump 40 for supplying liquid under a much higher pressure than that of the gas supplied to the pump 39. The balanced valve mechanism 32 of the spool type shown in FIG. 1 is represented in FIG. 2 together with the connections to the eight ports 24 to 31 inclusive. A filter F adjacent the generator 38 is of the type disclosed in the copending application of Powell et al. Ser. No. 164,631 dated January 5, 1962, now abandoned, forms no part of the present invention yet is believed to be a substantial factor in reducing the impurities in the high pressure gas tending to cause sticking of the spool valve 32.

Returning to FIG. 1 a cylinder 42 secured onto extension 23 by the screw threads illustrated or in any convenient manner, is provided with a piston 43 to one side of which is supplied gas from the generator 38 through the fitting 44. On its opposite side piston 43 compresses a high temperature high pressure lubricating grease for the spool type balanced valve 32 supplied through grease passageways 45 and 46 to the ten holes 47 leading to the surface of spool 32. The supply passageways 45 and 46 do not of course, pass through the ports 24 to 31 inclusive, but must be formed to pass around these ports. Thus any leakage of gas into the necessary clearance space surrounding a movable element like spool type cylinder valve is sealed at its high pressure because the grease seals around each port are subjected to almost the same pressures on each side so far as the higher pressure passageways 28, 29, 26 and 27 are concerned. The lower pressure exhaust passageways 24, 25, 30 and 31 while not so well balanced are perhaps better able to distribute the grease over the spool surface without loss.

In operation the pump and valve of FIG. 2 has only just this instant reached the end of its stroke to the right. High pressure gas has been supplied to the left side of the pump piston in FIG. 2 and rod 20 attached to the pump piston has been moving to the right with the pump piston. Just as it reaches the end of its stroke or to be more precise just before the pump piston reaches the end of its stroke, it has continued to move rod 20 and rod 20 has contacted the end of tube 17 moving it and the sleeve 12 to the position illustrated. The rod 20 has moved sleeve 12 uncovering port 15 for the exhaust of gas from cylinder 10 well before sleeve 12 reaches the end of its travel to the illustrated position because the movement of piston in cylinder 39 (FIG. 2) is not rapid. On reaching that FIG. 1 position gas is admitted from the generator 38 (FIG. 2) to the right side of piston 11 slamming piston 11 to the left without the sleeve 12 or tube 17 following. Spool 32 moves with piston 11 after its lost motion connection has imparted kinetic energy to the spool valve to loosen any carbonaceous material that may be causing the spool to tend to stick. Piston 11 moves to the left until the ports 24 and 25, and the ports 26 and 27 are connected through portions 33 and 34 of reduced diameter. Piston 11 is shown as having portions on each side to keep the main piston area away from each end wall of cylinder 10 and insure space for supply pressure to act on the piston when needed. After piston 11 has moved to the left end of its cylinder the 1st and 3rd ports 24, and 26 are opened for the purpose of moving pistons in the pump cylinders 39 and 40 to the left and exhausting gas from the left end of cylinder 39 as shown in FIG. 2. The movements of these pump pistons and rod 20 are not nearly as rapid as is the movement of piston 11 and the spool type valve 32. As rod 20 moves to the left with the pump pistons, it eventually strikes plug 22 in tube 17 sliding tube 17, and sleeve 12 to the left in FIG. 1 and finally connecting gas inlet port 13 with cylinder port 15. At this time piston 11 is quickly slammed to the right sliding spool valve 32 to the right and connecting ports 28 and 30 for supplying gas pressure to the left end of pump cylinder 39 and exhausting gas from the right end of this pump cylinder. This starts the pump pistons moving to the right slowly until rod 20 has its enlarged end 21 strike the right end of tube 17 for moving tube 17 and sleeve 12 to the right until inlet port 13 again is connected with cylinder port 16 for again slamming piston 11 to the left and repeating the cycle of operations. In order that pressure on the grease in cylinder 42 and in passageway 45 and 46 are under about the same high pressure to which the grease over the spool surface is subjected, as port in connection 44 is supplied with gas from the generator 38. The knob shown on the left end of piston rod 14 is of use in cleaning the apparatus of all grease after use when this knob may facilitate checking free movement of the piston 11, spool type valve 32 and all sliding parts therebetween including the enlarged end of the lost motion connection 35, bushing 36, and guide 36a. The cap at the right end of cylinder 42 is threaded onto this cylinder. Cylindrical member 41 is also in threaded engagement with the cylinder 10 and extension 23 in which the spool 32 slides.

Figure 3:
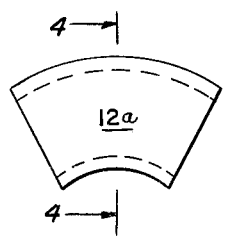
FIG. 3 is a side view of a metal shoe placed over the wearing portion of the O rings carried by the sleeve.
Figure 4:
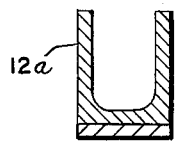
FIG. 4 is a section of this shoe on the line 4—4 of FIG. 3.

Because the O rings illustrated within the sleeve 12 must each of them slide over one of the gas ports 15 and 16, it has been found that the usual plastic of which O rings are formed becomes badly cut by the edges of these ports and useless before the few minutes of operation of this mechanism are passed. Therefore a thin metal shoe or guard 12a is placed around the O packing ring for say 5 to 10 degrees or more circumferentially each side of where it engages such port. FIGS. 3 and 4 show such a shoe to be of a short U shaped cross section with the sides of the U extending between the packing ring and the groove walls and far enough into the groove in which the O ring is placed, to hold it in position.

The entire valve mechanism as constructed and tested was quite small being only about one inch inside diameter. The spool type valve and its housing is preferably made of a fine grade of cast iron known as Mechanite, the sleeve is of bronze, and the other parts of this FIG. 1 mechanism of a high strength allow steel. The shoe of FIGS. 3 and 4 is of any thin inexpensive metal such as iron, copper, aluminum, or tin and need not be of an expensive wear resisting character because it may be replaceable after a run of 6 or 8 minutes of possible operation. Any convenient means may be used for retaining the shoe in place on the O ring periphery where it slides over a port. One such means is a clamping action of the sides of the shoe upon the O ring. Another is the use of a flexible adhesive between the shoe and O ring. A further such means is the use of projections stamped from or attached to the shoe and fitting into the material of the O ring.

The chief advantage of the in-line valve mechanism shown in FIG. 1 is perhaps its ability to successfully function quickly without sticking when handling the high pressure high temperature gaseous products of combustion containing carbonaceous material that tend to make valves stick. A filter F shown in FIG. 2 has to be especially constructed as a compromise for this particular work to withstand the high heat and pressure and yet not have too large a pressure drop across it.

I claim:

1. In an apparatus including a gas generator having an output under pressure of about 1500 pounds per square inch at a temperature of about 900° F., and a valve mechanism for receiving and shifting said output periodically in a predetermined manner and comprising three axially aligned and joined cylinders, the innermost cylinder having two groups of opposed pairs of ports, each of said pairs comprising an inlet and an outlet port, a cylindrical spool slidable in said innermost cylinder provided with two portions of reduced diameter for connecting opposed ports alternately in each of said groups, and end cylinder having a piston therein, means for operating said piston, and a piston rod connected to said piston, the combination therewith of the improvement for positively effecting shifting of said output, said improvement comprising a lost motion connection between said spool and said piston rod for joltingly moving said spool in response to reciprocation of said rod, and means including the other end cylinder cooperating with said innermost cylinder and with said gas generator for supplying said innermost cylinder with grease at said output pressure.

2. The combination of claim 1 further characterized by said means for supplying grease to said innermost cylinder including a plurality of grease passageways in said innermost cylinder wherein said last means include a piston and a further means for charging said other end cylinder with gas from said gas generator.

3. A valve comprising
   a cylinder having a port at either end,
   slidable means encircling said cylinder for introducing hot gas into said cylinder through each of said ports alternatively,
   a piston in said cylinder,
   an extension of said cylinder connected thereto,
   two groups of opposed pairs of ports in said extension, each of said pairs having one port indirectly cooperating with external means to effect movement of said slidable means at predetermined intervals,
   a cylindrical spool within said extension provided with two portions of reduced diameter longitudinally spaced for connecting opposed ports alternatively in each of said groups,
   a lost motion connection between said spool and said piston for joltingly reciprocating said spool in response to reciprocation of said piston,
   and means for greasing and sealing said spool.

4. A valve according to claim 3 further characterized by said means for greasing and sealing said spool comprising:
   passageways within said extension for supplying grease around said spool between said ports,
   a cylinder for grease connected to said extension and cooperating therewith,
   a piston in said last-mentioned cylinder for pressurizing said grease in said last-mentioned cylinder and said passageways, and means for introducing hot gas into said last-mentioned cylinder to maintain substantially the same pressure on each of said pistons.

References Cited by the Examiner

UNITED STATES PATENTS

| | | | |
|---|---|---|---|
| 2,036,464 | 4/1936 | Dodge | 103—48 |
| 2,545,506 | 3/1951 | Walsh | 103—48 |
| 2,636,441 | 4/1953 | Woelfer | 103—48 |
| 2,860,019 | 11/1958 | Osmun | 277—188 |
| 2,887,094 | 5/1959 | Krukemeier | 121—164 |
| 2,898,134 | 8/1959 | Moskow | 277—188 |
| 3,001,360 | 9/1961 | Budzich et al. | 103—48 X |

ISADOR WEIL, *Primary Examiner.*

ROBERT M. WALKER, *Examiner.*

C. GORDON, *Assistant Examiner.*